United States Patent [19]

Hrivnyak

[11] 3,790,012
[45] Feb. 5, 1974

[54] SPARE TIRE AND WHEEL CARRIER
[76] Inventor: John Hrivnyak, 2055 Harward, Berkley, Mich. 48072
[22] Filed: June 7, 1972
[21] Appl. No.: 260,425

[52] U.S. Cl............................ 214/454, 224/42.21
[51] Int. Cl............................................ B62d 43/00
[58] Field of Search .......... 214/451, 452, 453, 454; 224/42.23, 42.21, 42.06

[56] References Cited
UNITED STATES PATENTS
| | | | |
|---|---|---|---|
| 2,645,394 | 7/1953 | De Bord | 214/454 |
| 2,449,544 | 9/1948 | Ballard | 224/42.23 |
| 3,620,396 | 11/1971 | Abfalter | 214/454 |
| 3,718,226 | 2/1973 | Penley | 214/454 |
| 3,650,424 | 3/1972 | Dumas | 214/454 |

Primary Examiner—Gerald M. Forlenza
Assistant Examiner—John Mannix
Attorney, Agent, or Firm—Robert G. Mentag

[57] ABSTRACT

A spare tire and wheel carrier for a pickup truck, camper and the like which includes a transverse member having a pair of angled tire clamping shoulder portions. A hanger means is disposed at each of said transverse member and it has a lower end pivotally connected to the transverse member and an upper end fixed to the frame of the vehicle. The carrier includes a center supporting arm which has its inner end secured to the transverse member and means for releasably securing the center arm to the vehicle frame.

5 Claims, 8 Drawing Figures

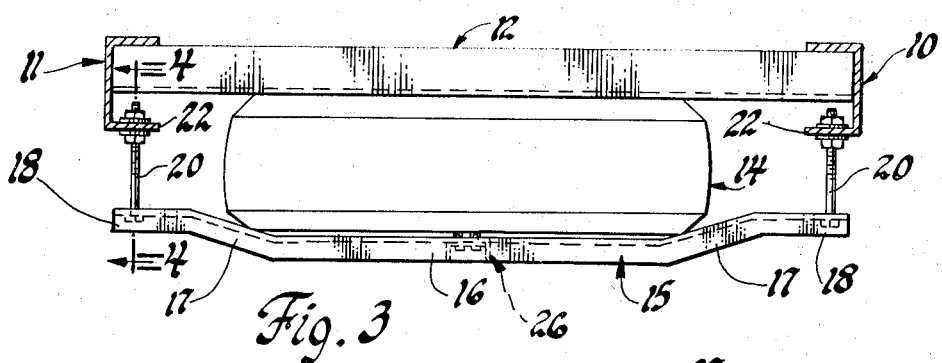
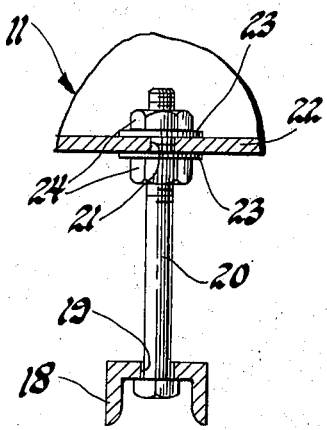
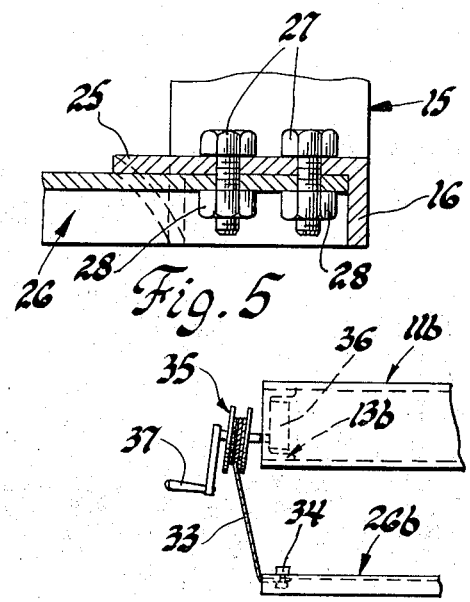
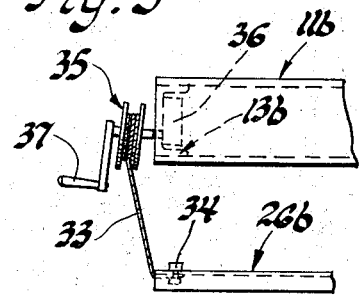
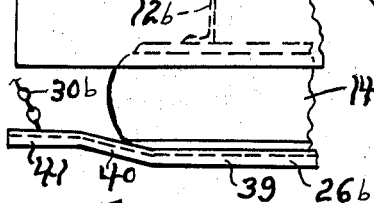
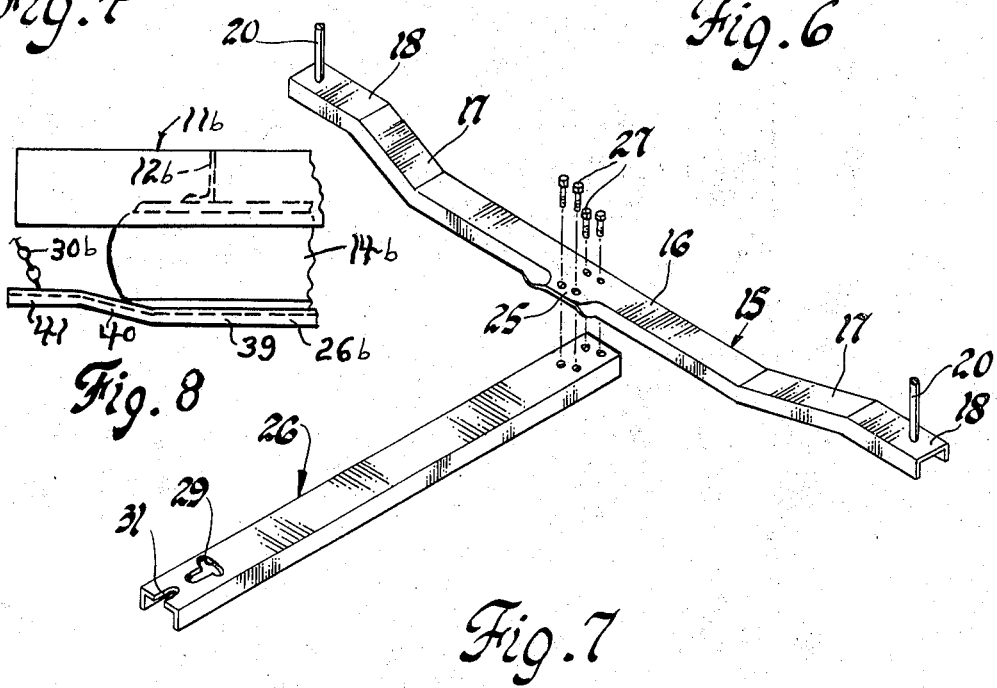

SPARE TIRE AND WHEEL CARRIER

SUMMARY OF THE INVENTION

This invention relates to a tire and wheel carrier for vehicles such as pickup trucks, campers, mobile homes and the like.

Heretofore, it has been common practice to provide pickup trucks, campers, mobile homes and other vehicles with a spare tire and wheel carrier which is disposed in a position under the vehicle which makes it difficult to remove a tire and wheel from a carrier, and also to load a tire and wheel onto the carrier. Many of such prior art tire and wheel carriers are mounted in a position beneath the rear end of the vehicle frame, and they are attached to the vehicle frame in such a manner that a great effort is required to be exerted from an awkward position under the vehicle to load a tire onto the carrier and to unload a tire therefrom. Accordingly, it is an object of the present invention to provide a novel and improved spare tire and wheel carrier which overcomes the disadvantages of the prior art spare tire and wheel carriers.

It is another object of the present invention to provide a spare tire and wheel carrier which is simple and compact in construction, economical to manufacture and efficient in operation.

It is still another object of the present invention to provide a spare tire and wheel carrier for a pickup truck, camper, mobile home and like vehicles which has a vehicle supporting frame, and which carrier comprises a transverse cross member. The transverse cross member includes a central horizontal portion, an upwardly and outwardly sloping tire clamping shoulder portion integrally formed on each of the outer ends of said central portion, and a horizontal end portion integrally formed on the outer end of each of the sloping tire clamping shoulder portions. The carrier further includes a longitudinal center arm which has its inner end secured to the transverse cross member at a central point thereon. A hanger means is disposed at each of the transverse cross member end portions and has a lower end pivotally connected to the adjacent end portion, and an upper end fixed to the vehicle frame. A means is operatively mounted on the vehicle for releasable locking engagement with the longitudinal center arm for retaining a spare tire and wheel in a position locked between the vehicle frame and the longitudinal center arm and the tire clamping shoulder portions of the transverse cross member. For extra heavy tires, the longitudinal center arm may be provided with an upwardly sloping tire clamping portion.

It is a further object of the present invention to provide a novel and improved spare tire and wheel carrier for a pickup truck, camper, mobile home and like vehicles which includes a transverse cross member that is provided with upwardly sloping tire clamping portions that are adapted to engage tires of varying diameters and hold all of such varying diameter tires in a solid locked position against the underside of a vehicle frame.

Other objects, features and advantages of this invention will be apparent from the following detailed description, appended claims, and the accompanying drawings.

BRIEF DESCRIPTION OF THE DRAWINGS

FIG. 3 is a fragmentary, elevational, section view of the structure illustrated in FIG. 1, taken along the line 3—3 thereof, and looking in the direction of the arrows.

FIG. 4 is a fragmentary, enlarged, elevational, section view of the structure illustrated in FIG. 1, taken along the line 4—4 thereof, and looking in the direction of the arrows.

FIG. 5 is a fragmentary, enlarged, elevational, section view of the structure illustrated in FIG. 2, taken along the line 5—5 thereof, and looking in the direction of the arrows.

FIG. 6 is a fragmentary, elevational view of a modified embodiment wherein a winch is employed instead of a chain for securing the carrier member to a vehicle frame.

FIG. 7 is an exploded perspective view of the embodiments of FIGS. 1 through 5.

FIG. 8 is a fragmentary, side elevational view of a second embodiment of the invention, and showing the longitudinal center arm provided with an upwardly sloping tire clamping portion.

DESCRIPTION OF THE PREFERRED EMBODIMENTS

Figure 1:
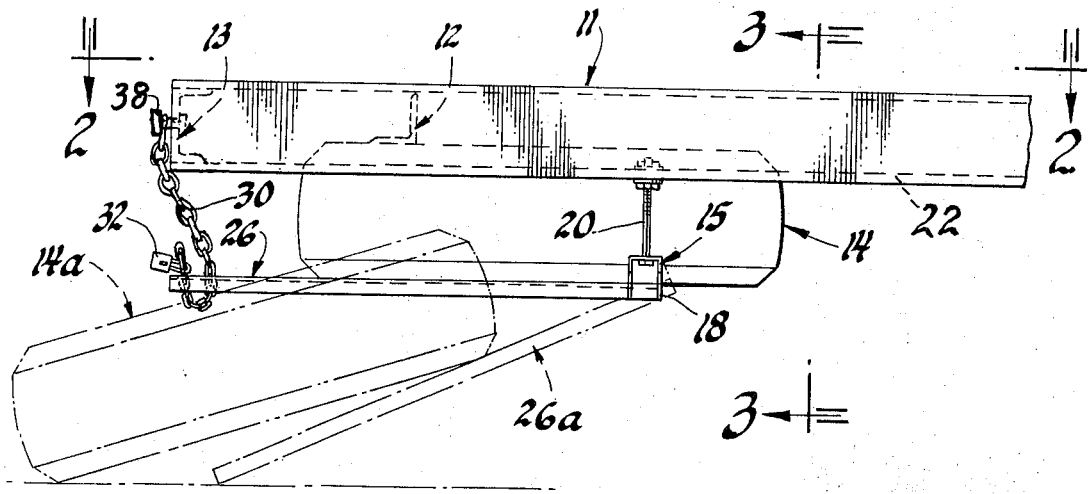
FIG. 1 is a side elevational view of a spare tire and wheel carrier made in accordance with the principles of the present invention.
Figure 2:
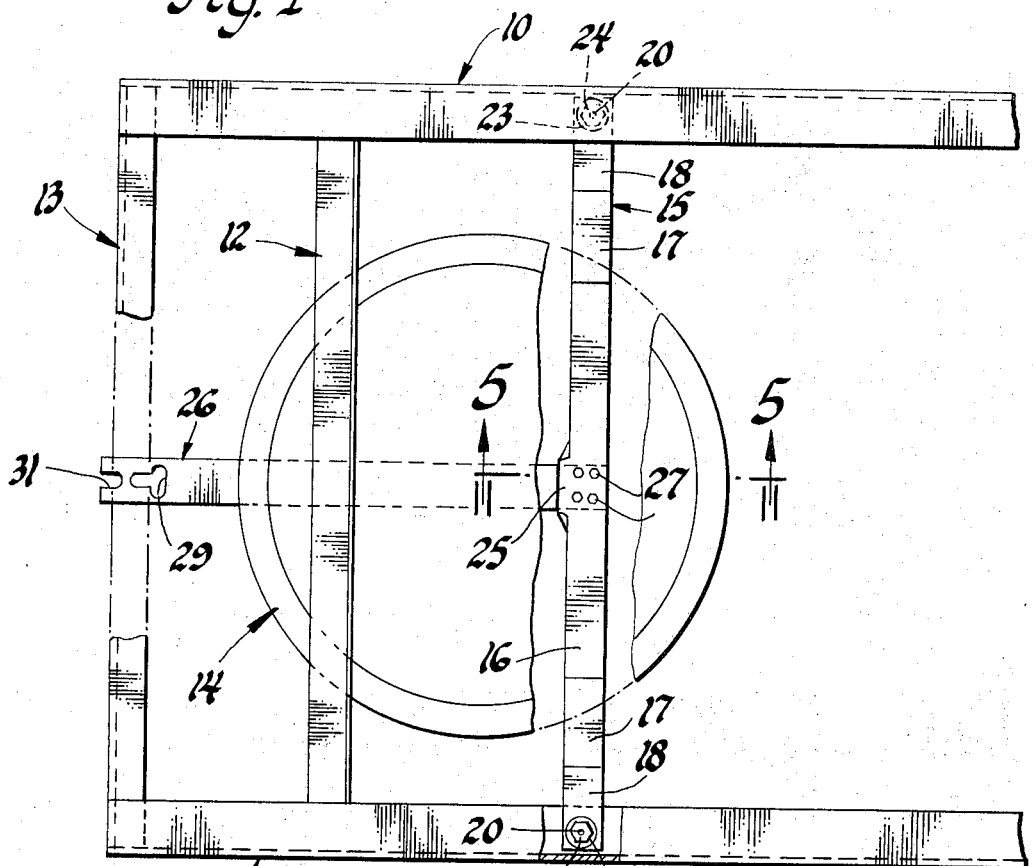
FIG. 2 is a top plan view of the structure illustrated in FIG. 1, with parts broken away, taken along the line 2—2 thereof, and looking in the direction of the arrows.

Referring now to the drawings and in particular to FIGS. 1 and 2, the numerals 10 and 11 generally designate the usual, spaced apart, longitudinal vehicle frame members which form a truck frame or the like, and which are illustrated as being channel shaped in cross section. The numeral 12 generally designates a conventional transverse vehicle angle frame member which has its ends slidably mounted within the longitudinal channel members 10 and 11 and which is secured thereto by any suitable means, as by welding. The angle iron frame member 12 is disposed forwardly from the rear end of the channels 10 and 11. The numeral 13 generally designates a conventional transverse vehicle frame channel member which is disposed at the rear ends of the longitudinal channels 10 and 11 and which has its ends slidably mounted within the channel members 10 and 11 and secured thereto by any suitable means, as by welding.

The numeral 14 generally designates a spare tire and wheel for a vehicle, such as a pickup truck, which is adapted to be held in the solid position shown in FIG. 1 for transportation purposes. The numeral 14a in FIG. 1 shows the spare tire and wheel in broken lines in a lowered position where it may be loaded onto or unloaded from the spare tire and wheel carrier of the present invention.

As best seen in FIGS. 1, 2, 3 and 7, the spare tire and wheel carrier of the present invention include a channel shaped transversely extended supporting cross frame member generally indicated by the numeral 15, which has its end operatively attached to the longitudinal channel members 10 and 11, as more fully explained hereinafter. The transverse frame member 15 is stamped from sheet metal, although it will be understood that it could be formed from any other material and it can be made to other shapes, as for example a solid bar.

The transverse frame member 15 includes a central elongated portion 16, which has a flat upper surface, and to the ends of which are integrally formed a pair of upwardly and outwardly sloping tire clamping shoulder portions 17. Integrally formed on the outer end of each of the sloping shoulder portions 17 is an outer horizontal attachment end portion 18 which has a flat upper surface that is a continuation of the flat upper surfaces of the adjacent sloping shoulder 17 and the intermediate portion 16. In one embodiment, the transverse frame member 15 had an intermediate portion 16 which was approximately twelve inches in length, with the sloping shoulder portions 17 being approximately eight inches in length and the outer end portions 18 being approximately one and three-quarters inches in length. The upper surface of each of the sloping shoulder portions 17 angles upwardly from the flat surface of the central or intermediate portion 16 at a slight clamping angle, as for example, from an angle in the range of from about three degrees up to and including eight degrees. A preferable angle is about five degrees.

As best seen in FIGS. 1, 3 and 4, the horizontal end portions 18 of the transverse frame member 15 are pivotally mounted relative to the lower flange 22 of the longitudinal channel members 10 and 11. As shown in FIG. 4, each of the end portions 18 has a vertically disposed aperture 19 through which is extended a hanger bolt 20. The bolt 20 extends upwardly through a suitable aperture 21 formed through the flange 22. Each of the hanger bolts 20 is fixedly secured to its respective flange 22 by a pair of suitable washers 23 and lock nuts 24. The apertures or holes 19 are enlarged to permit the transverse frame member 15 to be pivoted on the heads of the hanger bolts 20 about the longitudinal axis of the frame member 15 so as to permit loading and unloading of a tire and wheel, as described more fully hereinafter.

As best seen in FIG. 7, the spare tire and wheel carrier of the present invention includes a longitudinal center arm 26 which may be made from any suitable material. The illustrative center arm 26 is channel-shaped in cross section, and it is preferably stamped from a suitable sheet metal material.

As shown in FIGS. 2, 3, 5 and 7, the inner end of the longitudinal center arm 26 is fixedly secured to a flat central area 25 on the transverse frame member 15 by a plurality of machine screws 27 and nuts 28. It will be understood that the longitudinal center arm 26 may also be secured to the transverse frame member 15 by other suitable means, as by rivets, or as by being welded thereto. The use of machine screws and nuts permits the carrier of the present invention to be sold in disassembled form for easy packaging in small containers so as to reduce storage and transportation charges.

As shown in FIGS. 2 and 7, the longitudinal center arm 26 is provided with a T-shaped chain slot 29 which is disposed adjacent the outer end of the center arm. The longitudinal center arm 26 is also provided with a U-shaped chain locking slot 31 on the extreme outer end thereof, in a position adjacent the T-shaped slot 29.

As illustrated in FIG. 1, a suitable chain 30 is provided for retaining the longitudinal center arm 26 in a raised, operative position. One end of the chain 30 is secured by any suitable means, as by the chain mounting bolt 38 to a central point on the transverse member 13 on the rear end of the vehicle frame. The lower end of the chain 30 extends downwardly through the T-shaped slot 29 and then upwardly through the U-shaped slot 31. A suitable key operated lock 32 is employed for locking the chain 30 in the operative position shown in FIG. 1.

FIG. 6 illustrates another embodiment of the invention, and the parts thereof which correspond to the parts of the first embodiment of FIGS. 1 through 5 have been marked with the same reference numerals followed by the smaller letter "b." In the embodiment of FIG. 6 the chain 30 has been replaced by a suitable hand operated cable winch.

In FIG. 6 the cable winch is generally indicated by the numeral 35, and it is operatively mounted on a transverse mounting member 36 which is fixedly mounted on the vehicle frame transverse member 13b. The winch cable 33 has its free end operatively connected by a suitable mounting bolt 34 to the outer end of the longitudinal carrier center arm 26b. The winch 35 is manually operated by a removable winch handle 37.

The use of the spare tire and wheel carrier of the present invention is illustrated in FIG. 1. The spare tire 14 of FIG. 1 can be unloaded by merely removing the lock 32 and the free end of the chain 30 from the outer end of the longitudinal center arm 26. The longitudinal center arm 26 is then pivoted downwardly by gravity to the broken line position 26a, whereby the tire 14 may then be quickly and easily slid to the unloaded position designated by the numeral 14a. In order to load the tire back onto the carrier it is merely necessary to slide the same upwardly onto the carrier with the inner end of the tire extended beyond the transverse member 15. The weight of the tire extended forward beyond the transverse member 15 counterbalances the carrier and makes it easier to manually lift the longitudinal center arm 26 and again raise it to the solid line position shown in FIG. 1. The chain 30 is then again inserted through the slots 29 and 31 and the lock 32 put in position to secure the chain in place.

The winch retaining structure of FIG. 6 would be operated in a similar manner except that the longitudinal center arm 26b would be raised and lowered by manually rotating the crank handle 37. An advantage of the winch operated structure of FIG. 6 is that it is easier to load and unload heavier tires as, for example, tires for three-quarter and one ton pickup trucks and the like. The structure of FIG. 6 also permits the operator to make smaller adjustments or movements of the longitudinal center arm 26b for securing the tire against the vehicle frame.

FIG. 8 is a fragmentary elevational view of a second embodiment of the invention for use with heavy tires. The parts of the embodiment of FIG. 8 which are the same as the parts of the first described embodiment of FIGS. 1–5 have been marked with the same reference numerals followed by the small letter "b."

The embodiment of FIG. 8 is the same as the first embodiment of FIGS. 1 through 5, with the exception that the longitudinal center arm 26b has been provided with an upwardly sloping tire clamping shoulder portion. The numeral 39 indicates the main body portion of the longitudinal center arm 26b which is provided with an integral and upwardly and outwardly sloping tire clamping portion 40 adjacent the rear or outer end thereof. An extreme end portion 41 is integrally formed on the rear end of the tire clamping portion 40. The upper surfaces of the center arm portions 39 and 41 would be substantially flat and parallel with each other. The tire clamping shoulder portion 40 of the structure of FIG. 8 would securely clamp a heavy tire against the bottom of a vehicle frame to prevent the tire from sliding, and especially when the center arm 26b is being moved upwardly to the locked position.

It will be understood that the holes 21 for the hanger bolts 20 are normally present in many vehicle frames. However, if they are not already available, they may be quickly and easily formed by any suitable means.

It will be understood that hanger bolts 20 of various lengths may be used for adjusting the distance between the transverse frame member 15 and the underside of the vehicle frame for holding tires of various sizes. The last mentioned distance may also be adjusted by adjusting the position of the hanger bolt 20 relative to the nuts 24.

It will be understood that the spare tire and wheel carrier of the present invention may be used for carrying tires of various sizes. The sloping shoulders 17 provide a means wherein tires of varying diameters may be carried on the same size carriers, since it is only necessary to move the tire longitudinal of the carrier, as required, so as to make it seat properly on the sloping shoulders 17 for clamping engagement against the underside of the vehicle frame when the carrier is swung upwardly to the solid line.

While it will be apparent that the preferred embodiments of the invention herein disclosed are well calculated to fulfill the objects above state, it will be appreciated that the invention is susceptible to modification, variation and change.

What I claim is:

1. In a spare tire and wheel carrier for a vehicle having a supporting frame, the combination comprising:
   a. a transversely disposed supporting cross member having a central elongated horizontal portion, an upwardly and outwardly sloping tire clamping shoulder portion integrally formed on each of the outer ends of said central portion, and a horizontal end portion integrally formed on the outer end of each of the sloping tire clamping shoulder portions;
   b. said central horizontal portion having a flat upper surface, each of said sloping tire clamping portions having a flat upper surface which is a continuation of the flat upper surface of the central portion, and each of said sloping portion flat surfaces angles upwardly from the flat surface of the central portion at an acute angle from the plane of the central portion flat surface;
   c. a longitudinally disposed center supporting arm having its inner end secured to the transverse cross member at a central point thereof;
   d. a hanger means disposed at each of said transverse cross member end portions and having a lower end pivotally connected to the adjacent end portion and an upper end fixed to the vehicle supporting frame; and,
   e. means operatively mounted on said vehicle for releasable locking engagement with said longitudinal center arm for retaining a spare tire and wheel in a position locked and clamped between the vehicle supporting frame and the longitudinal center arm and the flat upper surface of the sloping tire clamping shoulder portions of the transverse cross member.

2. The spare tire and wheel carrier defined in claim 1, wherein:
   a. said means for locking engagement with said longitudinal center arm comprises a chain having one end attached to said vehicle supporting frame and the other end releasably locked to the outer end of said longitudinal center arm.

3. The spare tire and wheel carrier defined in claim 1, wherein:
   a. said means for locking engagement with said longitudinal center arm comprises a winch operatively mounted on said vehicle frame and having a winch cable secured to the outer end of said longitudinal center arm.

4. The spare tire and wheel carrier defined in claim 1, wherein:
   a. each of said hanger means includes a hanger bolt having an upper end fixed to said vehicle frame and a lower end pivotally connected to said respective cross member end portion.

5. The spare tire and wheel carrier defined in claim 1, wherein:
   a. said longitudinal center arm is provided with an upwardly and outwardly sloping tire clamping shoulder portion formed on the outer end thereof.

* * * * *